US012055795B2

(12) United States Patent
Nomura

(10) Patent No.: US 12,055,795 B2
(45) Date of Patent: Aug. 6, 2024

(54) SPECTACLE LENS

(71) Applicant: HOYA LENS THAILAND LTD., Pathumthani (TH)

(72) Inventor: Takumi Nomura, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 491 days.

(21) Appl. No.: 17/360,237

(22) Filed: Jun. 28, 2021

(65) Prior Publication Data

US 2021/0325693 A1 Oct. 21, 2021

Related U.S. Application Data

(63) Continuation of application No. PCT/JP2019/051544, filed on Dec. 27, 2019.

(30) Foreign Application Priority Data

Dec. 28, 2018 (JP) ................................. 2018-247619

(51) Int. Cl.
*G02C 7/02* (2006.01)
(52) U.S. Cl.
CPC .................................... *G02C 7/022* (2013.01)
(58) Field of Classification Search
CPC .... G02C 7/022; G02C 7/02; B29D 11/00009; B29D 11/00865; G02B 1/115; G02B 1/14; G02B 1/16; G02B 1/18
USPC .......................................................... 351/44
See application file for complete search history.

(56) References Cited

U.S. PATENT DOCUMENTS

| | | | |
|---|---|---|---|
| 6,013,372 A | 1/2000 | Hayakawa et al. | |
| 2005/0013842 A1 | 1/2005 | Qiu et al. | |
| 2005/0266248 A1 | 12/2005 | Millero et al. | |
| 2012/0019913 A1 | 1/2012 | Nishimoto et al. | |
| 2013/0278989 A1 | 10/2013 | Lam et al. | |
| 2016/0303623 A1* | 10/2016 | Peltz | B08B 7/0057 |
| 2016/0365541 A1* | 12/2016 | Wehlus | C03C 14/006 |
| 2017/0205680 A1* | 7/2017 | Trajkovska-Broach | G02F 1/1525 |
| 2017/0368742 A1* | 12/2017 | Slep | B29D 11/00009 |
| 2018/0231857 A1* | 8/2018 | Kim | G02F 1/15245 |

FOREIGN PATENT DOCUMENTS

| | | |
|---|---|---|
| CN | 106233162 A | 12/2016 |
| CN | 106461814 A | 2/2017 |
| CN | 107430228 A | 12/2017 |
| JP | H09-230107 A | 9/1997 |
| JP | H09-327622 A | 12/1997 |
| JP | 2006-056949 A | 3/2006 |
| JP | 2009-500645 A | 1/2009 |
| JP | 2010-101918 A | 5/2010 |
| JP | 2010-237637 A | 10/2010 |
| JP | 2012-027300 A | 2/2012 |

(Continued)

OTHER PUBLICATIONS

Jul. 11, 2022 Extended Search Report issued in European Patent Application No. 19905638.3.

(Continued)

*Primary Examiner* — William R Alexander
(74) *Attorney, Agent, or Firm* — Oliff PLC

(57) ABSTRACT

The spectacle lens includes a coating film containing tungsten oxide particles, tin oxide particles, and silver particles on a surface of a lens substrate.

12 Claims, 1 Drawing Sheet

(56) References Cited

FOREIGN PATENT DOCUMENTS

JP       2018-159860 A     10/2018
WO    2005/014074 A1    2/2005

OTHER PUBLICATIONS

Feb. 17, 2023 Office Action issued in Chinese Patent Application No. 201980086827.X.
May 18, 2023 Office Action Issued in Chinese Patent Application No. 201980086827.X.
Jun. 29, 2023 Office Action Issued in Korean Patent Application No. 10-2021-7022164.
Nov. 29, 2022 Office Action issued in Korean Patent Application No. 10-2021-7022164.
Aug. 29, 2022 Office Action issued in Chinese Patent Application No. 201980086827.X.
Oct. 4, 2022 Office Action issued in Japanese Patent Application No. 2018-247619.
Mar. 31, 2020 Search Report issued in International Patent Application No. PCT/JP2019/051544.
Mar. 31, 2020 Written Opinion issued in International Patent Application No. PCT/JP2019/051544.
Jun. 16, 2021 International Preliminary Report on Patentability issued in International Patent Application No. PCT/JP2019/051544.
Apr. 10, 2024 Office Action issued in European Patent Application No. 19905638.3.

\* cited by examiner

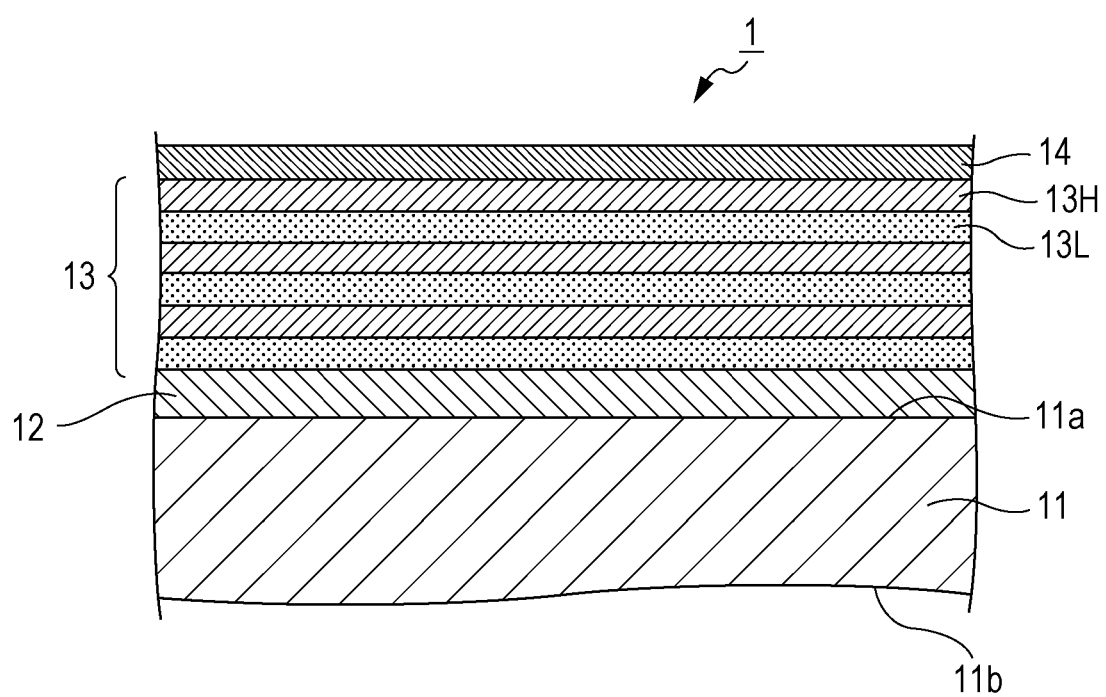

SPECTACLE LENS

CROSS-REFERENCE TO RELATED APPLICATIONS

This application is a Continuation of PCT International Application No. PCT/JP2019/051544 filed on Dec. 27, 2019, which was published under PCT Article 21(2) in Japanese and claims priority under 35 U.S.C. § 119(a) to Japanese Patent Application No. 2018-247619 filed on Dec. 28, 2018. Each of the above applications is hereby expressly incorporated by reference, in its entirety, into the present application.

TECHNICAL FIELD

The present disclosure relates to a spectacle lens having antibacterial performance and antistatic performance on a lens surface.

BACKGROUND ART

The spectacle lens includes various layers covering the surface of a lens substrate. Examples thereof include a hard coat layer for preventing damage to a lens substrate, an antireflective layer for preventing light reflection on a lens surface, a water-repellent layer for preventing water spotting on a lens, and an antifogging layer for preventing fogging of a lens. Furthermore, there is known a spectacle lens that has antibacterial performance on a lens surface and is suitable for a user working, in particular, in a clean environment such as a medical site, and a spectacle lens that has antistatic performance on a lens surface and is capable of preventing adhesion of dust or the like.

Patent Literature 1 discloses an antibacterial surface coating agent containing a specific polymerizable compound and zeolite ion-substituted mainly with silver ions.

In addition, Patent Literature 2 discloses spectacles including fine particles of tungsten oxide or a composite material of tungsten oxide on a lens surface and having high antifogging performance and photocatalytic performance such as antibacterial/sterilizing performance.

In addition, Patent Literature 3 discloses an optical product (cameras, spectacles, and the like) that includes a dielectric multilayer film including a low refractive index dielectric layer and a high refractive index dielectric layer on a surface of a substrate such a lens, in which a dielectric layer including metal ion-supporting zeolite (antibacterial material) is disposed on an outermost layer of the dielectric multilayer film, and that exhibits antibacterial properties while having optical functions such as antireflection.

CITATION LIST

Patent Literature

Patent Literature 1: JP 9-327622 A
Patent Literature 2: JP 2010-101918 A
Patent Literature 3: JP 2018-159860 A

SUMMARY

As described above, a lens having antibacterial performance has conventionally existed, but in order to sufficiently exhibit antibacterial performance, it is necessary to increase the film thickness of a layer containing an antibacterial material to, for example, about 50 nm to 100 nm. When a coating film with such an increased film thickness is applied onto the antireflective film of the spectacle lens, interference fringes are generated, which deteriorates optical characteristics. Therefore, a new antireflective film design is required, and the above coating film cannot be applied onto an antireflective film of an existing design. In Patent Literature 3 described above, an optical function such as antireflection is provided, but the film design of the dielectric multilayer film becomes considerably complicated.

Further, when not only the antibacterial performance but also the antistatic performance are simultaneously provided, it is necessary to newly provide a layer containing a conductive material such as indium tin oxide (ITO) on the lens surface. That is, in order to simultaneously obtain antibacterial performance and antistatic performance, respective films are conventionally formed, and there is a problem that it is difficult to obtain good optical characteristics of the lens surface.

An aspect of the present disclosure provides for a spectacle lens capable of simultaneously obtaining high antibacterial performance and antistatic performance with the same film on a lens surface.

As a result of intensive studies to solve the above problems, the present inventors have completed the present disclosure. That is, an aspect of the present disclosure has the following configurations.

(Configuration 1)
A spectacle lens including a coating film containing tungsten oxide particles, tin oxide particles, and silver particles on a surface of a lens substrate.

(Configuration 2)
The spectacle lens according to configuration 1, wherein all of the tungsten oxide particles, the tin oxide particles, and the silver particles are particles having a particle size smaller than a film thickness of the coating film.

(Configuration 3)
The spectacle lens according to configuration 1 or 2, wherein the coating film has a film thickness of 3 nm or more and 30 nm or less.

(Configuration 4)
The spectacle lens according to any one of configurations 1 to 3, wherein all of the tungsten oxide particles, the tin oxide particles, and the silver particles have a particle size of 2 nm or more and 5 nm or less.

(Configuration 5)
The spectacle lens according to any one of configurations 1 to 4, wherein the coating film contains a binder component containing silicon oxide as a main component.

(Configuration 6)
The spectacle lens according to any one of configurations 1 to 5, wherein the coating film further contains molybdenum.

(Configuration 7)
The spectacle lens according to any one of configurations 1 to 6, wherein the spectacle lens has an antireflective film below the coating film.

According to an aspect of the spectacle lens of the present disclosure, since the coating film containing tungsten oxide particles, tin oxide particles, and silver particles is provided on the surface of the lens substrate, high antibacterial performance and antistatic performance of the lens surface can be obtained with the same film (the coating film). Even when the coating film has a thin film thickness of 30 nm or less, high antibacterial performance and antistatic performance can be simultaneously obtained. Therefore, the optical characteristics of the lens surface are not deteriorated, which is favorable.

BRIEF DESCRIPTION OF DRAWINGS

FIG. 1 is a cross-sectional view of an embodiment of a spectacle lens of the present disclosure.

DESCRIPTION OF EMBODIMENTS

Hereinafter, embodiments for carrying out the present disclosure will be described in detail with reference to the drawings.

FIG. 1 is a cross-sectional view of an embodiment of a spectacle lens of the present disclosure.

<Configuration of Spectacle Lens>

In a spectacle lens 1 of the present embodiment, a hard coat film for protecting the lens surface from scratches and the like, an antireflective film for preventing light reflection on the lens surface, and the like are formed on a spectacle lens substrate.

More specifically, referring to FIG. 1, the spectacle lens 1 of the present embodiment has a hard coat film 12 on one surface 11a (for example, an object-side surface) of a lens substrate 11, and has an antireflective film 13 thereon. The antireflective film 13 is a layered film in which a low refractive index layer 13L and a high refractive index layer 13H are alternately built up. In the present embodiment, a coating film 14 containing tungsten oxide particles, tin oxide particles, and silver particles is provided on the antireflective film 13. Details of the configuration of the coating film 14 will be described later.

Hereinafter, the lens substrate 11, the hard coat film 12, and the antireflective film 13 will be described in order.

<Lens Substrate>

The lens substrate 11 in the present embodiment has a first main surface (object-side surface), a second main surface (eyeball-side surface), and an edge surface (edge).

The material of the lens substrate 11 may be plastic or inorganic glass, but various substrates usually used as plastic lenses can be used. The lens substrate can be produced by injecting a lens monomer into a lens forming mold and performing a curing treatment.

The lens monomer is not particularly limited, and various monomers usually used in the production of the plastic lens can be used. For example, monomers having a benzene ring, a naphthalene ring, an ester bond, a carbonate bond, a urethane bond, or the like in the molecule can be used. Further, a compound containing sulfur and a halogen element can be used, and in particular, a compound having a nuclear halogen-substituted aromatic ring can also be used. A lens monomer can be produced by using one or more of the monomers having the above functional groups. For example, styrene, divinylbenzene, phenyl (meth)acrylate, benzyl (meth)acrylate, naphthyl (meth)acrylate, methyl (meth)acrylate, diethylene glycol bisallyl carbonate, diallyl (iso) phthalate, dibenzylitaconate, dibenzylfumarate, chlorostyrene, nuclear halogen substituted styrene, nuclear halogen substituted phenyl (meth)acrylate, nuclear halogen substituted benzyl (meth)acrylate, (di) (meth)acrylate of a tetrabromobisphenol A derivative, diallyl carbonate of a tetrabromobisphenol A derivative, dioltochlorobenzyl itaconate, dioltochlorobenzyl fumarate, diethylene glycol bis(orthochlorobenzyl) fumarate, (di)ethylene glycol di(meth)acrylate, glycidyl methacrylate, a reaction product of polyfunctional isocyanate such as xylylene diisocyanate and hexamethylene diisocyanate, a reaction product of monohydroxyacrylate of a nuclear halogen-substituted phenol derivative and polyfunctional isocyanate, a reaction product of monohydroxyacrylate of a nuclear halogen-substituted biphenyl derivative and polyfunctional isocyanate, a reaction product of xylene diisocyanate and polyfunctional mercaptan, and a reaction product of glycidyl methacrylate and polyfunctional methacrylate; and mixtures thereof. Examples of the material of the lens substrate include polyurethane-based materials such as a polythiourethane resin and a polyurethane resin, epithio-based materials such as a polysulfide resin, polycarbonate-based materials, and diethylene glycol bisallyl carbonate-based materials.

As the lens substrate 11, a colorless material is usually used, but a colored material can be used as long as transparency is not impaired.

The refractive index of the lens substrate 11 is, for example, 1.50 or more and 1.74 or less.

The lens substrate 11 may be either a finish lens or a semi-finish lens.

The surface shape of the lens substrate 11 is not particularly limited, and may be any of a flat surface, a convex surface, a concave surface, or the like.

The spectacle lens 1 of the present embodiment may be any of a single focus lens, a multifocal lens, a progressive addition lens, or the like. In a progressive addition lens, a near vision region (near portion) and a progressive region (intermediate region) are included in a lower region, a distance vision region (distance portion) is included in an upper region.

<Hard Coat Film>

The hard coat film 12 can impart scratch resistance to the plastic lens.

As a method for forming the hard coat film 12, a method of applying a curable composition to the surface of the lens substrate 11 by a spin coating method or the like and curing the coating film is generally used. The curing treatment is performed by heating, light irradiation, or the like, depending on the type of the curable composition.

Examples of such a curable composition include a photocurable silicone composition containing, as a main component, a silicone compound that produces a silanol group upon irradiation with ultraviolet rays and an organopolysiloxane having a reactive group such as a halogen atom or an amino group that condenses with the silanol group, an acrylic UV curable monomer composition, and an inorganic fine particles-containing thermosetting composition in which inorganic fine particles such as $SiO_2$ and $TiO_2$ are dispersed in a silane compound having a polymerizable group such as a vinyl group, an allyl group, an acrylic group, or a methacryl group and a hydrolyzable group such as a methoxy group, or a silane coupling agent. The composition of the hard coat film 12 is selected according to the material of the lens substrate 11. Note that the refractive index of the hard coat film 12 is, for example, 1.45 or more and 1.74 or less.

<Antireflective Film>

The antireflective film 13 usually has a multilayer structure in which layers having different refractive indexes are built up, and is a film that prevents reflection of light by an interference action. Examples of the material of the antireflective film 13 include inorganic substances such as $SiO_2$, SiO, $ZrO_2$, $TiO_2$, TiO, $Ti_2O_3$, $Ti_2O_5$, $Nb_2O_5$, $Al_2O_3$, $Ta_2O_5$, $CeO_2$, MgO, $Y_2O_3$, $SnO_2$, $MgF_2$, and $WO_3$, and these can be used alone or in combination of two or more.

As an example of such an antireflective film 13, a multilayer structure formed by building up a low refractive index layer 13L and a high refractive index layer 13H in multiple layers can be exemplified. The refractive index of the low refractive index layer 13L is, for example, 1.35 to 1.80 at a wavelength of 500 to 550 nm. The refractive index of the high refractive index layer 13H is, for example, 1.90 to 2.60 at a wavelength of 500 to 550 nm.

The low refractive index layer 13L is made of, for example, silicon dioxide ($SiO_2$) having a refractive index of about 1.43 to 1.47. The high refractive index layer 13H is made of a material having a refractive index higher than that of the low refractive index layer 13L, and is made of, for example, a metal oxide such as niobium oxide ($Nb_2O_5$), tantalum oxide ($Ta_2O_5$), zirconium oxide ($ZrO_2$), yttrium oxide ($Y_2O_3$), or aluminum oxide ($Al_2O_3$) at an appropriate ratio.

When the material of the antireflective film 13 is an inorganic substance such as a metal oxide as described above, as a method for forming the inorganic film, for example, vacuum deposition, an ion plating method, a sputtering method, a CVD method, a method of precipitating by a chemical reaction in a saturated solution, or the like can be adopted.

Next, a coating film containing tungsten oxide particles, tin oxide particles, and silver particles, which are characteristic configurations in the present disclosure, will be described in detail.

As described above, the spectacle lens 1 of the present embodiment has the coating film 14 containing tungsten oxide particles, tin oxide particles, and silver particles on the surface of the lens substrate 11.

The tungsten oxide ($W_2O_3$, $WO_2$, $WO_3$) particles are known as a photocatalyst that exhibits antibacterial performance by light irradiation in an ultraviolet light and visible light region, and when the coating film 14 containing the tungsten oxide particles is provided on the surface of the lens substrate 11, the lens surface can have antibacterial performance.

In addition, the tin oxide ($SnO_2$) particles are a conductive material, and when the coating film 14 contains the tin oxide particles, antistatic performance can be imparted to the lens surface.

When the coating film 14 contains the silver (Ag) particles, the antibacterial performance in the ultraviolet light and visible light region can be improved.

The content of the tungsten oxide particles is not particularly limited, but from the viewpoint of obtaining good antibacterial performance, the content in the coating liquid for forming the coating film 14 may be in a range of 0.25 wt % to 0.80 wt %. The content may be in a range of 0.50 wt % to 0.80 wt %.

The content of the tin oxide particles is not particularly limited, but from the viewpoint of obtaining good antistatic performance, the content in the coating liquid for forming the coating film 14 may be in a range of 0.10 wt % to 0.35 wt %. The content may be in a range of 0.20 wt % to 0.35 wt %.

The content of the silver particles is also not particularly limited, but from the viewpoint of improving antibacterial performance, the content in the coating liquid for forming the coating film 14 may be in a range of 0.025 wt % to 0.10 wt %. The content may be in a range of 0.05 wt % to 0.10 wt %.

All of the tungsten oxide particles, the tin oxide particles, and the silver particles may be particles having a particle size smaller than the film thickness of the coating film 14. This is because when particles having a particle size larger than the film thickness of the coating film 14 are contained, protrusions are formed on the surface of the coating film 14, which deteriorates the optical performance of the lens surface.

The film thickness of the coating film 14 containing the tungsten oxide particles, the tin oxide particles, and the silver particles may be in a range of 3 nm or more and 30 nm or less from the viewpoint of reduction in the film thickness. The film thickness may be in a range of 10 nm or more and 15 nm or less. In the present disclosure, by using the tungsten oxide particles and the silver particles in combination, high antibacterial performance can be obtained even when the coating film 14 has a thin film thickness of, for example, 30 nm or less. That is, the film thickness of the coating film 14 that exhibits antibacterial performance can be reduced, and therefore optical characteristics of the lens surface are not deteriorated. The present disclosure is particularly effective when the coating film 14 thus exhibiting antibacterial performance has a thin film thickness of 30 nm or less.

As described above, the tungsten oxide particles, the tin oxide particles, and the silver particles may be particles having a particle size smaller than the film thickness of the coating film 14, but in consideration of the case where the coating film 14 has a thin film thickness of 3 nm or more and 30 nm or less, the tungsten oxide particles, the tin oxide particles, and the silver particles may have a particle size of 2 nm or more and 5 nm or less.

In the present embodiment, the coating film 14 may further contain a binder component containing silicon oxide ($SiO_2$) as a main component. By containing the binder component containing silicon oxide as a main component, adhesion of the coating film 14 can be improved.

A higher content of the binder component containing silicon oxide as a main component is more effective, but an excessively high content causes cloudiness of the coating film 14. Therefore, the content of the binder component may be, for example, in a range of 0.6 to 1.0 wt % with respect to the amount of the coating liquid for forming the coating film 14.

In the present embodiment, the coating film 14 may further contain molybdenum (Mo). By containing this molybdenum, conductivity is improved, so that antistatic performance provided by the coating film 14 can be further improved.

The content of the molybdenum may be, for example, in a range of 0.05 wt % to 0.1 wt % with respect to the amount of the coating liquid for forming the coating film 14.

Incidentally, both the silicon oxide particles and the molybdenum particles may be particles having a particle size smaller than the film thickness of the coating film 14, and in consideration of the case where the coating film 14 has a thin film thickness of 3 nm or more and 30 nm or less, both the silicon oxide particles and the molybdenum particles may have a particle size of 2 nm or more and 5 nm or less.

As a method for forming the coating film 14, for example, a dip coating method can be used. Specifically, the coating film 14 is formed on the lens surface by immersing a lens in a coating liquid containing the tungsten oxide particles, the tin oxide particles, and the silver particles, and, for example, further containing the binder component ($SiO_2$), the molybdenum, and an additive such as a surfactant as necessary for a certain period of time (for example, about 10 seconds to 30 seconds), then pulling up and drying the lens. As a solvent of the coating liquid, for example, water is used. At this time, the liquid temperature, the immersion time, the pulling speed, the drying conditions (temperature, time), and the like are appropriately adjusted. The coating film thickness of the coating film 14 can be adjusted by appropriately adjusting these coating conditions.

As shown in FIG. 1, in the spectacle lens 1 of the present embodiment, the antireflective film 13 is provided below the coating film 14. According to the present embodiment, since the film thickness of the coating film 14 that exhibits antibacterial performance and antistatic performance can be reduced to, for example, 30 nm or less, the antireflection performance provided by the antireflective film 13 is not affected, and therefore the coating film can be easily applied onto an antireflective film of an existing design.

In the embodiment of FIG. 1, an aspect in which the coating film 14 is provided on one surface 11a (for example, an object-side surface) of the lens substrate 11 is illustrated, but the present disclosure is not limited thereto, and there may be an aspect in which the coating film 14 is provided not only on the first main surface (object-side surface) of the lens substrate 11 but also on the other second main surface (eyeball-side surface).

As described above, according to the spectacle lens of the present embodiment, since the coating film containing tungsten oxide particles, tin oxide particles, and silver particles is provided on the surface of the lens substrate, high antibacterial performance and antistatic performance of the lens surface can be obtained with the same film (the coating film 14). In addition, even when the coating film has a thin film thickness of, for example, 30 nm or less, high antibacterial performance and antistatic performance can be simultaneously obtained, and therefore optical characteristics of the lens surface are not deteriorated (generation of interference fringes and the like). The spectacle lens of the present embodiment is particularly effective when the coating film 14 exhibiting antibacterial performance and antistatic performance has a thin film thickness of, for example, 30 nm or less. Then, since the film thickness of the coating film 14 exhibiting antibacterial performance and antistatic performance can be reduced to, for example, 30 nm or less, antireflection performance provided by the antireflective film 13 is not affected, and therefore the coating film can be easily applied onto an antireflective film of an existing design.

In addition, in the present embodiment, the coating film 14 further contains a binder component containing silicon oxide as a main component, whereby adhesion of the coating film 14 can be improved.

In addition, in the present embodiment, since the coating film 14 further contains molybdenum, conductivity is improved, so that antistatic performance provided by the coating film 14 can be further improved.

EXAMPLES

Hereinafter, the present disclosure will be further described in more detail with reference to Examples.

Example 1

A hard coat liquid containing inorganic oxide particles and a silicon compound was applied by spin coating to the entire surface of one surface (convex surface) of a spectacle lens substrate produced from a monomer for a spectacle lens (trade name "MR8" manufactured by Mitsui Chemicals, Inc.), and was heated and cured at 100° C. for 60 minutes to form a single-layer hard coat film having a thickness of 3 µm.

Next, the spectacle lens on which the hard coat film was formed was placed in a vapor deposition apparatus, and an antireflective film in which $SiO_2$—$ZrO_2$—$SiO_2$ layers were alternately built up was formed on the entire surface of the hard coat film by a vacuum deposition method.

(Preparation of Coating Liquid for Forming Coating Film)

A coating liquid A for forming a coating film containing 0.5 wt % of tungsten oxide particles (particle size: 5 nm), 0.2 wt % of tin oxide particles (particle size: 5 nm), 0.05 wt % of silver particles (particle size: 5 nm), 0.65 wt % of silicon dioxide particles (particle size: 5 nm), and 0.06 wt % of molybdenum particles (particle size: 5 nm) in water as a solvent was prepared.

(Formation of Coating Film)

The spectacle lens on which the antireflective film has been formed was immersed in the coating liquid A prepared as described above for a certain period of time, then pulled up, and dried with hot air at 80° C. for 1 hour. Note that the liquid temperature of the coating liquid was room temperature (25° C.), the immersion time was 30 seconds, and the pulling speed was 1 mm/sec. In this way, a coating film having a film thickness of 15 nm was formed on each of both surfaces (convex surface and concave surface) of the spectacle lens.

A spectacle lens of Example 1 was produced as described above.

Example 2

A coating film having a film thickness of 15 nm was formed on each of both surfaces (convex surface and concave surface) of a spectacle lens by using a coating liquid B prepared in the same manner except that the silicon dioxide particles in the coating liquid A used in Example 1 were not contained. A spectacle lens of Example 2 was produced in the same manner as in Example 1 except for this.

Example 3

A coating film having a film thickness of 15 nm was formed on each of both surfaces (convex surface and concave surface) of a spectacle lens by using a coating liquid C prepared in the same manner except that the molybdenum particles in the coating liquid A used in Example 1 were not contained. A spectacle lens of Example 3 was produced in the same manner as in Example 1 except for this.

Comparative Example 1

A coating liquid D for forming a coating film containing 0.5 wt % of tungsten oxide particles (particle size: 5 nm), 0.2 wt % of tin oxide particles (particle size: 5 nm), 0.65 wt % of silicon dioxide particles (particle size: 5 nm), and 0.06 wt % of molybdenum particles (particle size: 5 nm) in water as a solvent was prepared.

A coating film having a film thickness of 50 nm was formed on each of both surfaces (convex surface and concave surface) of a spectacle lens by adjusting coating conditions using the coating liquid D not containing silver particles. A spectacle lens of Comparative Example 1 was produced in the same manner as in Example 1 except for this.

The spectacle lenses of Examples 1 to 3 and Comparative Example 1 obtained as described above were subjected to the following evaluation tests. The results are summarized in Table 1 below.

[Antibacterial Performance]

Antibacterial performance was evaluated in accordance with JIS Z 2801: 2012. Note that a spectacle lens in which the coating film was not formed on the lens surface was used as a reference sample.

A test piece of 50 mm×50 mm (each of the spectacle lenses of the above Examples and Comparative Example, and the above reference sample) is placed in a sterilized petri dish, and then 0.4 mL of a bacterial suspension containing $1.0 \times 10^5$ to $4.0 \times 10^5$ test bacteria (*Staphylococcus aureus* or *Escherichia coli*) is dropped to the center of the sample, and the sample is covered with a polyethylene film cut into 40 mm×40 mm. The viable cell count per 1 cm² in the petri dish after culture at a relative humidity of 90% or more for 24 hours is measured, and the following antibacterial activity value is calculated.

Antibacterial activity value=$Ut-At \geq 2.0$

Ut: average of logarithmic values of the viable cell count per 1 cm² after 24 hours of culture of an untreated test piece (reference sample)

At: average of logarithmic values of the viable cell count per 1 cm² after 24 hours of culture of a test piece subjected to antibacterial treatment (samples of Examples and Comparative Example)

The criteria for antibacterial performance were as follows.

⊙: The antibacterial activity value is 4.0 or more.
○: The antibacterial activity value is 2.5 or more and less than 4.0.
Δ: The antibacterial activity value is 2.0 or more and less than 2.5.
x: The antibacterial activity value is less than 2.0.

[Antistatic Performance]

The surface resistance value of the lens surface was measured using Hiresta UP MCP-HT model 450 manufactured by Mitsubishi Chemical Analytech Co., Ltd.

The criteria for antistatic performance were as follows.

⊙: The surface resistance value is less than $5.0 \times 10^9 \Omega/A$
○: The surface resistance value is $5.0 \times 10^9 \Omega/$ or more and less than $5.0 \times 10^{10} \Omega/A$
Δ: The surface resistance value is $5.0 \times 10^{10} \Omega/$ or more and less than $1.0 \times 10^{11} \Omega/A$
x: The surface resistance value is $1.0 \times 10^{11} \Omega/A$ or more

[Coating Film Adhesion]

The coating film formed on the surface of the spectacle lens was wiped with acetone, and the presence of film peeling of the coating film was observed. The criteria were as follows.

○: There is no film peeling, and adhesion is good.
Δ: Film peeling is slightly observed, but there is no problem in practical use.
x: Film peeling occurs.

TABLE 1

| | Antibacterial properties (*Staphylococcus*) | Antibacterial properties (*Escherichia coli*) | Antistatic properties | Coating film adhesion |
|---|---|---|---|---|
| Example 1 | ○ | ⊙ | ⊙ | ○ |
| Example 2 | ○ | ⊙ | ⊙ | Δ |
| Example 3 | ○ | ⊙ | ○ | ○ |
| Comparative Example 1 | ○ | x | ⊙ | ○ |

[Evaluation Result]

As can be seen from the results in Table 1 above, all the spectacle lenses of Examples 1 to 3 can obtain high antibacterial performance and antistatic performance of the lens surface with the same film (the coating film). In addition, even when the coating film has a thin film thickness of, for example, 30 nm or less (15 nm in the above Examples), high antibacterial performance and antistatic performance can be simultaneously obtained.

On the other hand, the spectacle lens of Comparative Example 1 containing tungsten oxide particles but not containing silver particles in the coating film cannot obtain antibacterial performance against at least *Staphylococcus aureus* unless the film thickness of the coating film is increased to 50 nm. Even if the film thickness of the coating film is increased as described above, antibacterial performance against *Escherichia coli* cannot be obtained.

Example 4

A coating film having a film thickness of 3 nm was formed on each of both surfaces (convex surface and concave surface) of a spectacle lens by adjusting coating conditions using the coating liquid A (provided that preparation was performed in the same manner except that tungsten oxide particles, tin oxide particles, silver particles, silicon dioxide particles, and molybdenum particles having a particle size of 2 nm were used) used in Example 1. A spectacle lens of Example 4 was produced in the same manner as in Example 1 except for this.

Example 5

A coating film having a film thickness of 5 nm was formed on each of both surfaces (convex surface and concave surface) of a spectacle lens by adjusting coating conditions using the coating liquid A (provided that preparation was performed in the same manner except that tungsten oxide particles, tin oxide particles, silver particles, silicon dioxide particles, and molybdenum particles having a particle size of 3 nm were used) used in Example 1. A spectacle lens of Example 5 was produced in the same manner as in Example 1 except for this.

Example 6

A coating film having a film thickness of 10 nm was formed on each of both surfaces (convex surface and concave surface) of a spectacle lens by adjusting coating conditions using the coating liquid A used in Example 1. A spectacle lens of Example 6 was produced in the same manner as in Example 1 except for this.

Example 7

A coating film having a film thickness of 20 nm was formed on each of both surfaces (convex surface and concave surface) of a spectacle lens by adjusting coating conditions using the coating liquid A used in Example 1. A spectacle lens of Example 7 was produced in the same manner as in Example 1 except for this.

Example 8

A coating film having a film thickness of 25 nm was formed on each of both surfaces (convex surface and concave surface) of a spectacle lens by adjusting coating conditions using the coating liquid A used in Example 1. A spectacle lens of Example 8 was produced in the same manner as in Example 1 except for this.

Example 9

A coating film having a film thickness of 30 nm were formed on each of both surfaces (convex surface and concave surface) of a spectacle lens by adjusting coating conditions using the coating liquid A used in Example 1. A spectacle lens of Example 9 was produced in the same manner as in Example 1 except for this.

The spectacle lenses of Example 4 to 9 obtained as described above were subjected to evaluation tests of antibacterial performance and antistatic performance. The test method and the criteria are the same as described above. The following optical performance was also evaluated. The results are summarized in Table 2 below. When the film thickness of the coating film was 15 nm, the spectacle lens of Example 1 was applied.

[Optical Performance]

The surface of each spectacle lens was visually observed under visible light to evaluate the presence of generation of interference fringes. The criteria were as follows.

○: Generation of interference fringes was not observed at all.

Δ: Generation of interference fringes was slightly observed, but at a practically acceptable level.

x: Generation of interference fringes at a practically problematic level was observed.

TABLE 2

|  | Coating film thickness (nm) | Optical performance | Antibacterial properties (*Staphylococcus*) | Antibacterial properties (*Escherichia coli*) | Antistatic properties |
|---|---|---|---|---|---|
| Example 4 | 3 | ○ | Δ | Δ | ○ |
| Example 5 | 5 | ○ | ○ | ○ | ○ |
| Example 6 | 10 | ○ | ○ | ⊙ | ⊙ |
| Example 1 | 15 | ○ | ○ | ⊙ | ⊙ |
| Example 7 | 20 | Δ | ○ | ⊙ | ⊙ |
| Example 8 | 25 | Δ | ○ | ⊙ | ⊙ |
| Example 9 | 30 | Δ | ○ | ⊙ | ⊙ |

[Evaluation Result]

As can be seen from the results in Table 2 above, both the spectacle lenses of Examples 1 and 4 to 9 can obtain high antibacterial performance and antistatic performance of the lens surface with the same film (the coating film). The film thickness of the coating film may be in a range of 10 nm to 30 nm from the viewpoint of antibacterial performance and antistatic performance, and may be in a range of 3 nm to 15 nm from the viewpoint of optical performance. When optical performance, antibacterial performance, and antistatic performance are evaluated in total, the film thickness of the coating film may be in a range of 10 nm to 15 nm.

When the optical performance of the spectacle lens of Comparative Example 1 was also evaluated, the optical performance was evaluated as x because the film thickness of the coating film necessary for exhibiting antibacterial performance was thick.

REFERENCE SIGNS LIST

1 Spectacle lens
11 Lens substrate
12 Hard coat film
13 Antireflective film
13H High refractive index layer
13L Low refractive index layer
14 Coating film

What is claimed is:

1. A spectacle lens, comprising a coating film containing tungsten oxide particles, tin oxide particles, and silver particles on a surface of a lens substrate,
   wherein all of the tungsten oxide particles, the tin oxide particles, and the silver particles are particles having a particle size smaller than a film thickness of the coating film.

2. The spectacle lens according to claim 1,
   wherein the coating film has a film thickness of 3 nm or more and 30 nm or less.

3. The spectacle lens according to claim 1,
   wherein the coating film further contains molybdenum.

4. The spectacle lens according to claim 1,
   wherein the spectacle lens has an antireflective film below the coating film.

5. The spectacle lens according to claim 1,
   wherein all of the tungsten oxide particles, the tin oxide particles, and the silver particles have a particle size of 2 nm or more and 5 nm or less.

6. The spectacle lens according to claim 1,
   wherein the coating film contains a binder component containing silicon oxide as a main component.

7. A spectacle lens, comprising a coating film containing tungsten oxide particles, tin oxide particles, and silver particles on a surface of a lens substrate,
   wherein all of the tungsten oxide particles, the tin oxide particles, and the silver particles have a particle size of 2 nm or more and 5 nm or less.

8. The spectacle lens according to claim 7,
   wherein the coating film further contains molybdenum.

9. The spectacle lens according to claim 7,
   wherein the spectacle lens has an antireflective film below the coating film.

10. A spectacle lens, comprising a coating film containing tungsten oxide particles, tin oxide particles, and silver particles on a surface of a lens substrate,
    wherein the coating film contains a binder component containing silicon oxide as a main component.

11. The spectacle lens according to claim 10,
    wherein the coating film further contains molybdenum.

12. The spectacle lens according to claim 10,
    wherein the spectacle lens has an antireflective film below the coating film.

* * * * *